US011227079B2

(12) United States Patent
Poston et al.

(10) Patent No.: US 11,227,079 B2
(45) Date of Patent: *Jan. 18, 2022

(54) AUTOMATIC CREATION OF GRAPH TIME LAYER OF MODEL OF COMPUTER NETWORK OBJECTS AND RELATIONSHIPS

(71) Applicant: BMC Software, Inc., Houston, TX (US)

(72) Inventors: Ricky Poston, Austin, TX (US); Michael Cooper, Kingwood, TX (US)

(73) Assignee: BMC Software, Inc., Houston, TX (US)

( * ) Notice: Subject to any disclaimer, the term of this patent is extended or adjusted under 35 U.S.C. 154(b) by 304 days.

This patent is subject to a terminal disclaimer.

(21) Appl. No.: 16/263,952

(22) Filed: Jan. 31, 2019

(65) Prior Publication Data

US 2019/0163851 A1 May 30, 2019

Related U.S. Application Data

(63) Continuation of application No. 14/961,235, filed on Dec. 7, 2015, now Pat. No. 10,229,243, which is a
(Continued)

(51) Int. Cl.
*G06F 11/30* (2006.01)
*G06F 30/18* (2020.01)
*G06F 11/32* (2006.01)
*H04L 12/26* (2006.01)
*H04L 12/24* (2006.01)
(Continued)

(52) U.S. Cl.
CPC .......... *G06F 30/18* (2020.01); *G06F 11/3006* (2013.01); *G06F 11/328* (2013.01); *H04L 41/0604* (2013.01); *H04L 41/12* (2013.01); *H04L 43/045* (2013.01); *G06F 9/45533* (2013.01); *G06F 9/45558* (2013.01); *G06F 11/2025* (2013.01); *G06F 11/3409* (2013.01); *G06F 2009/45575* (2013.01);
(Continued)

(58) Field of Classification Search
CPC ............ G06F 9/45533; G06F 9/45558; G06F 2009/45575; G06F 11/2025; G06F 11/3409; G06F 2009/45591; G06F 11/3006; G06F 11/328; G06F 30/18; H04L 43/045; H04L 63/1408; H04L 41/064; H04L 41/12; H04L 41/22; H04L 41/0604
See application file for complete search history.

(56) References Cited

U.S. PATENT DOCUMENTS 5,986,657 A 11/1999 Berteig et al.
6,590,587 B1 7/2003 Wichelman et al.
(Continued)

*Primary Examiner* — Kibrom K Gebresilassie
(74) *Attorney, Agent, or Firm* — Brake Hughes Bellermann LLP

(57) ABSTRACT

A method and system create a model of a set of relationships between a set of parent computer network objects and a set of corresponding child computer network objects, over a period of time, and output a user interface graphing the model in a single view to illustrate the set of relationships over the period of time. The parent computer network objects include virtual machines and the child computer network objects include hosts. The user interface includes a search option to provide for a search of problems with the child computer network objects over the period of time.

17 Claims, 5 Drawing Sheets

Related U.S. Application Data continuation of application No. 13/727,017, filed on Dec. 26, 2012, now Pat. No. 9,208,051.

(51) Int. Cl.
 *G06F 9/455* (2018.01)
 *H04L 29/06* (2006.01)
 *G06F 11/20* (2006.01)
 *G06F 11/34* (2006.01)

(52) U.S. Cl.
 CPC .. *G06F 2009/45591* (2013.01); *H04L 41/064* (2013.01); *H04L 41/22* (2013.01); *H04L 63/1408* (2013.01)

(56) References Cited

U.S. PATENT DOCUMENTS

| | | |
|---|---|---|
| 6,614,762 B1 | 9/2003 | Illiadis et al. |
| 6,788,315 B1 | 9/2004 | Kekic et al. |
| 7,545,797 B2 | 6/2009 | Jensen et al. |
| 7,979,245 B1 * | 7/2011 | Bourlatchkov ..... G06F 11/3409 703/2 |
| 8,116,205 B2 | 2/2012 | Reinold et al. |
| 8,122,116 B2 | 2/2012 | Matsunaga et al. |
| 8,175,863 B1 | 5/2012 | Ostermeyer et al. |
| 8,204,720 B2 | 6/2012 | Wiemer et al. |
| 8,219,591 B2 | 7/2012 | Arshavsky et al. |
| 8,245,140 B2 | 8/2012 | Barber et al. |
| 8,386,593 B1 * | 2/2013 | Gao ........................ H04L 41/22 709/223 |
| 8,395,623 B2 | 3/2013 | Houghtlin et al. |
| 8,935,129 B1 | 1/2015 | Gao et al. |
| 9,069,774 B1 * | 6/2015 | Ansari ................ G06F 11/3006 |
| 9,208,051 B2 * | 12/2015 | Poston ................ G06F 11/3006 |
| 9,516,053 B1 | 12/2016 | Muddu et al. |
| 9,553,948 B2 | 1/2017 | Wong et al. |
| 9,557,879 B1 | 1/2017 | Wang et al. |
| 10,038,707 B2 | 7/2018 | Muddu et al. |
| 10,229,243 B2 * | 3/2019 | Poston .................. G06F 11/328 |
| 10,778,664 B1 * | 9/2020 | Sullivan ................ G06F 16/248 |
| 2003/0020764 A1 | 1/2003 | Germain et al. |
| 2003/0033402 A1 | 2/2003 | Battat et al. |
| 2004/0199539 A1 | 10/2004 | Richardson et al. |
| 2004/0213189 A1 | 10/2004 | Alspaugh et al. |
| 2005/0172306 A1 * | 8/2005 | Agarwal ............... G06F 11/008 719/328 |
| 2006/0036476 A1 | 2/2006 | Klem et al. |
| 2006/0047809 A1 * | 3/2006 | Slattery ................ H04L 67/025 709/224 |
| 2006/0242282 A1 * | 10/2006 | Mullarkey .......... H04L 41/5009 709/223 |
| 2007/0268294 A1 * | 11/2007 | Eagen ..................... H04L 41/22 345/474 |
| 2008/0222706 A1 * | 9/2008 | Renaud ............... H04L 63/1408 726/4 |
| 2008/0316213 A1 | 12/2008 | Eagen et al. |
| 2009/0150639 A1 | 6/2009 | Ohata |
| 2009/0217099 A1 | 8/2009 | Kato |
| 2009/0300173 A1 * | 12/2009 | Bakman ................ H04L 41/147 709/224 |
| 2010/0250734 A1 * | 9/2010 | Ajiro ..................... G06F 9/5083 709/224 |
| 2011/0148880 A1 | 6/2011 | De Peuter |
| 2011/0161851 A1 * | 6/2011 | Barber .................. G06F 9/4856 715/769 |
| 2011/0179417 A1 * | 7/2011 | Inakoshi ................... G06J 1/00 718/1 |
| 2011/0316856 A1 | 12/2011 | Poston et al. |
| 2012/0053986 A1 | 3/2012 | Cardno et al. |
| 2012/0284628 A1 * | 11/2012 | Wong .................. G06F 11/0709 715/736 |
| 2012/0317491 A1 * | 12/2012 | Wong ..................... H04L 41/22 715/736 |
| 2013/0055145 A1 * | 2/2013 | Antony ............... H04L 63/1408 715/781 |
| 2014/0033055 A1 | 1/2014 | Gardner et al. |
| 2014/0180661 A1 * | 6/2014 | Poston ................ G06F 11/3006 703/13 |
| 2015/0067035 A1 | 3/2015 | Sullad et al. |
| 2015/0074060 A1 | 3/2015 | Varadharajan et al. |
| 2015/0149439 A1 | 5/2015 | Idei et al. |
| 2015/0154062 A1 * | 6/2015 | Watanabe ........... G06F 11/0751 714/26 |
| 2015/0154188 A1 | 6/2015 | Matejka et al. |
| 2015/0301698 A1 | 10/2015 | Roques |
| 2016/0077927 A1 | 3/2016 | Bhargava et al. |
| 2017/0155560 A1 * | 6/2017 | Lee ..................... H04L 41/5009 |
| 2017/0169112 A1 * | 6/2017 | Chiplonkar ......... G06F 16/9535 |
| 2018/0267833 A1 * | 9/2018 | Chen ..................... G06F 9/5083 |

* cited by examiner

AUTOMATIC CREATION OF GRAPH TIME LAYER OF MODEL OF COMPUTER NETWORK OBJECTS AND RELATIONSHIPS

RELATED APPLICATION

This application is a continuation of, and claims priority to U.S. application Ser. No. 14/961,235, entitled "AUTOMATIC CREATION OF GRAPH TIME LAYER OF MODEL OF COMPUTER NETWORK OBJECTS AND RELATIONSHIPS," filed on Dec. 7, 2015, which is a continuation of, and claims priority to U.S. application Ser. No. 13/727,017, entitled "AUTOMATIC CREATION OF GRAPH TIME LAYER OF MODEL OF COMPUTER NETWORK OBJECTS AND RELATIONSHIPS," filed on Dec. 26, 2012, each of which is hereby incorporated by reference in their entireties.

FIELD

This description relates generally to graphs of service models showing the relationships between computer network objects and the status of each object.

BACKGROUND

In a computer environment, a collection of equipment may provide functionality, such as e-mail. The collection of equipment may include a whole network of computers and objects that work together. A diagram of that network may be referred to a service model. Operations graphs of service models can be very large and complex, especially when cloud computing objects and virtual objects are involved. These operations graphs may show the relationships between objects and the status of each object. An important type of relationship is an impacting relationship, which means that a child object can impact the status or health of a parent object. The child object supplies resources to the parent object so the parent object can accomplish its tasks. If a child object goes down, then the parent object is negatively affected. When an object is impacted negatively by its child objects, an operations graph may show this by changing the visual appearance of the relationship path between the objects. For example if a child (such as a storage server) is causing the parent (such as an e-mail server) to go critical, it changes a relationship indicator. The user can then see which child is causing the parent to go critical.

The graph, however, is merely a snapshot of one moment in time and therefore it only shows the current relationships and the current status and causes. With the advent of virtual objects and cloud, however, an object's children may change over time as resources are automatically shifted about to handle demand. An object's status may change from red-green-red-green over time as a "bad" child moves in-out-in-out of relationship to the object. Therefore, if a user is trying to determine which child object is habitually causing problems for a parent object, the user must "catch" the graph before the "bad child" automatically shifts out from under the parent object.

In many cases, a problem can be much more complex than a single child causing an issue. For example, there may be a unique combination of certain children causing one or more issues. A snapshot view of a graph does not make it easy to identify the causal patterns in such an environment. Accordingly, there exists a need for systems and methods to address the shortfalls of present technology and to provide other new and innovative features.

SUMMARY

Systems and methods described here provide users with across-time relationship patterns in a graph view and the status effects of these relationships over a span of time.

In various implementations, a method includes creating, by a microprocessor of a computing device, a model of a set of relationships between a set of parent virtual machines and a corresponding set of child hosts, over a period of time, and displaying, on a display of the computing device, a user interface graphing the model in a single view to illustrate the set of relationships over the period of time. Other features are contemplated. For example, a search option may be included to provide for a search of issues with the child hosts in a specific time frame.

In various implementations, a method includes creating, by a microprocessor of a computing device, a model of a set of relationships between a set of parent computer network objects and a corresponding set of child computer network objects, over a period of time. A graph time layer and a status of each of the set of relationships are displayed on a display of the computing device graphing the model. Each status may be depicted at intervals over the period of time. A search option may be displayed to provide for a search of problems with the child computer network objects over the period of time.

Certain implementations include a system that may include a display, a memory including executable instructions, and a processor operably coupled to the memory and configured to execute the executable instructions to cause the system to access a model of a set of relationships between a set of parent virtual machines and a set of corresponding child hosts, over a period of time, and output on the display a user interface graphing the model in a single view to illustrate the set of relationships over the period of time and a status of each of the set of relationships. Each status may be depicted at intervals over the period of time.

One or more of the implementations of the subject matter described herein can be implemented so as to realize one or more of the following advantages. User has an easy way to see, in an integrated manner, relationships and causes over a span of time to look for casual patterns, rather than memorizing each time point state and then mentally trying to assemble a complete pattern of causal relationships over a span of time. A user may see a big picture of how objects have behaved over time within one view rather than requiring the user to go to different views or different log files to assemble all of this information.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
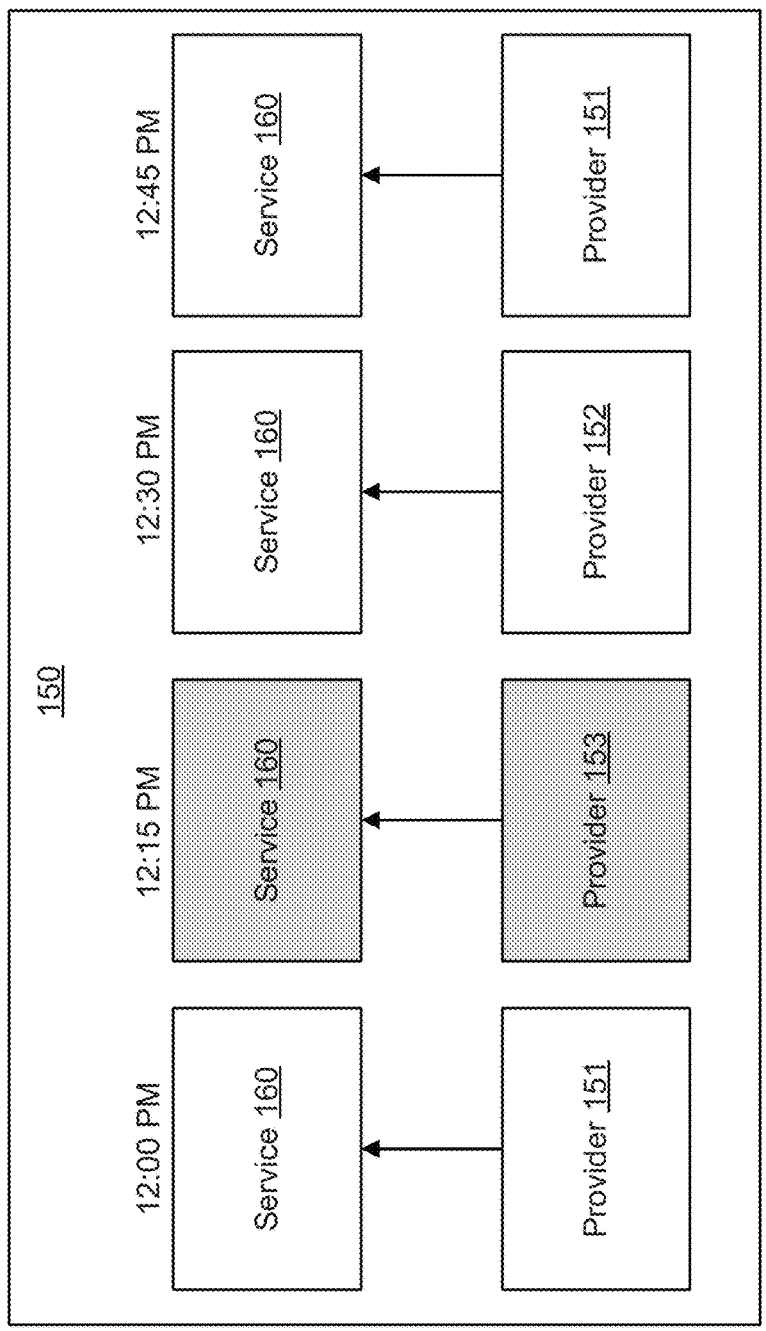
FIG. 1 illustrates an example graph of a parent and child object.
Figure 1:
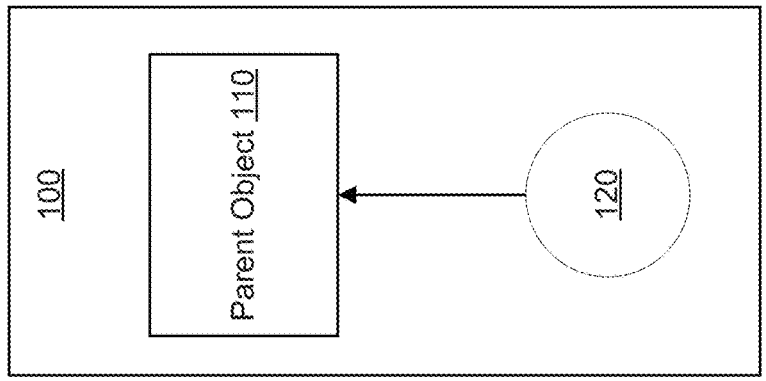

FIG. 1 illustrates an example graph of a parent and child object. As shown in the graph 100 of FIG. 1, parent object 110 and child object 120 may be connected. Parent object 110 and child object 120 may be, for example, computer network objects, services, servers, virtual machines, hosts, switches, routers, disk drives, applications, or other computer objects. Child object 120 may supply resources to the parent object 110 so the parent 110 object can accomplish its tasks. Parent object 110 may, over time, receive sub-services from other child objects, such as three different child objects (shown in graph 150). Over time, which child provides the sub-service changes. The graph 100 is a depiction of a snapshot in time (e.g., 11:00 AM) of child object 120 providing a service to parent object 110. The graph 150 is a depiction of four different snapshot views of providers and services over a period of time i.e., 12:00 PM, 12:15, 12:30, and 12:45 PM.

If the child object 110 experiences issues or goes down, then the parent object 120 may be negatively affected. When parent object 120 is impacted negatively by its child object 110, an operations graph may show this status by changing a visual appearance of a relationship path 130 between the objects. For example, if a child object 120 is causing the parent object 110 to go critical, an operations graph may change the relationship line 130 to be displayed in a certain color, such as red. A user can then see which child is causing a parent object to go critical.

The parent object 120 and the child object 110 can communicate through a network, for example, an intranet or the Internet. While the parent object 120 and the child object 110 are shown as two separate objects, in some implementations, the parent object 120 and the child object 110 can be part of the same device or system.

In one example, a user may know that over the last hour the status of a service, i.e., parent object 110, went into a warning status (which may be depicted, in some examples, with a particular color such as yellow). The user also knows that the providers/children object of this service change over time. Yet, in merely looking at this snapshot shown in the graph 100 of FIG. 1, the user can not what happened over time or what caused the warning status.

Graph 150 is a topology graph that illustrates, via the shading of the service 160 and provider 153 at time 12:15 PM, that provider 153 caused the service 160 to go to a warning status at 12:15 PM. It will be understood that such shading is for illustration purposes, and that various color schemes, shading, designs, or other graphical user interface elements may illustrate a warning or other status of a provider, service, relationship, etc., at different points in time in such a graph.

Yet, it is unclear from FIG. 1 why provider 153 automatically shifted into the provider role at 12:15 PM, or what was happening with providers 151 or 152, or why there was a shift at 12:30 PM and another shift at 12:45 PM. Thus, a graph with more detail over time is advantageous, and is shown in FIG. 2.

Figure 2:
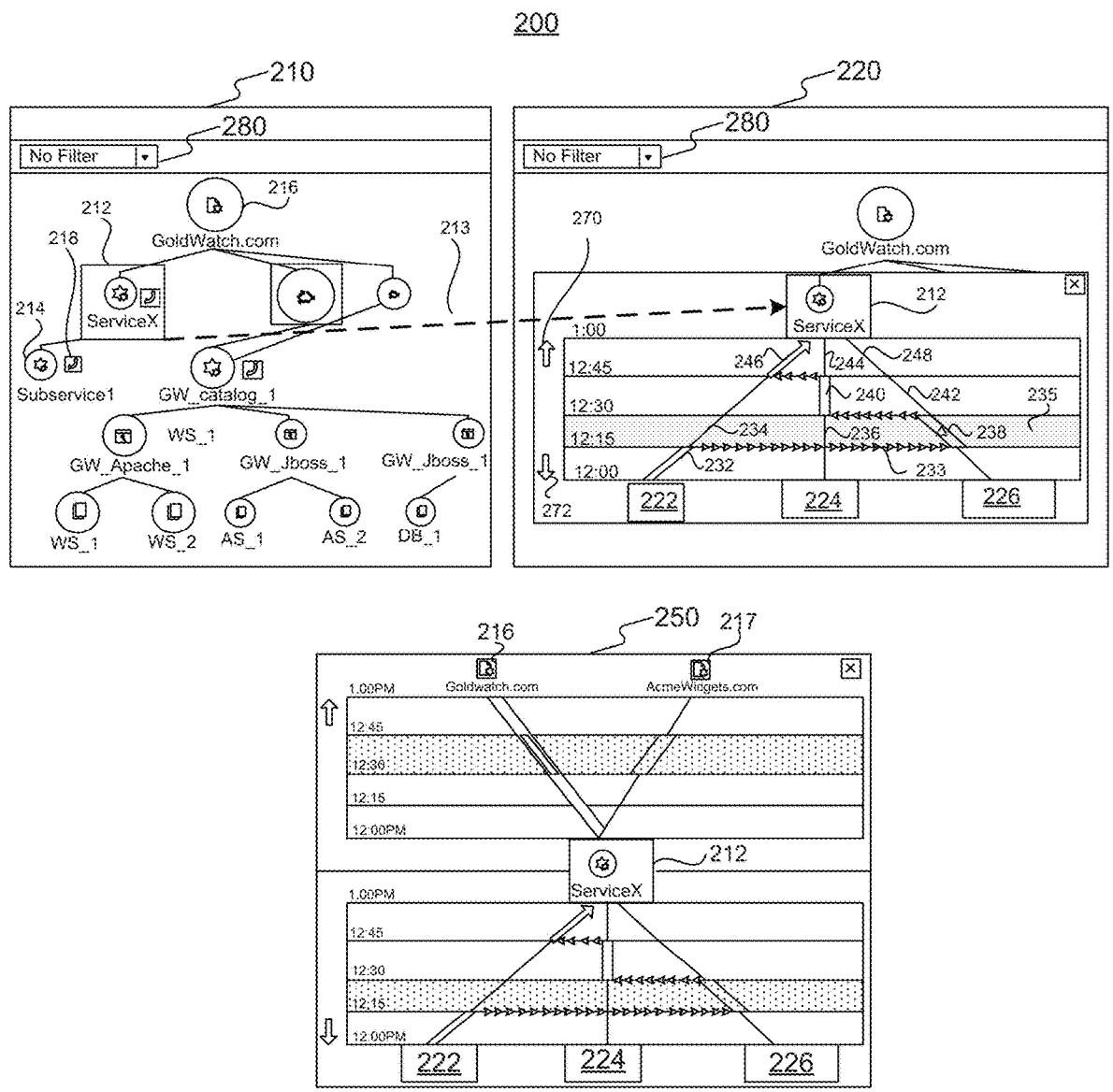
FIG. 2 is an example illustrating a graph time layer.

FIG. 2 illustrates an example graph time layer. Graph 200 may be shown, for example, when a user navigates an application or web page to a parent service of interest (e.g., ServiceX). Graph 200 includes a graph view 210, which includes a graphical user interface element 212 that may represent a parent object, i.e., "ServiceX". Other graphical user interface elements may represent subservices or other parent or child objects, such as subservice 214 and Gold-Watch.com 216, and indicators of historical changes, such as indicatory 218. Such elements may be represented by different shapes or colors (e.g., yellow, green) to indicate, for example, various states or statuses of each object. As an example, Goldwatch.com 216 may be a e-mail server and ServiceX 212 may be a storage server that stores e-mails. If something goes wrong with ServiceX 212, the system may automatically switch to another storage server.

A user may activate a "show time layer" function on this parent object. This can be done by any one of a number of activation methods associated with the graphical user interface element 212—e.g., a mouse click of element 212, a keyboard click, a right-click on a menu option, a toolbar icon selection, a swipe on a touch screen, etc. An activation of a "show time layer" function is illustrated by the dashed line 213.

A time layer overlay 220 appears within the graph 200 view. Within the graph view 210, the time layer 220 may be overlaid as a new layer in the graph view 210, for example over the object selected, or may be a pop-up HTML or other window. The expanded view 250 shows how, in one implementation, a user may also open a layer to show both providers and consumers. Each of the views shown in FIG. 2 may be illustrated using various colors, shading, or other techniques to depict changes in relationships, status of a relationship, warnings, or other aspects of the parent objects and child objects. The specific depiction and style of graph view 210, time layer 220, and expanded view 250 are intended for illustration.

As shown in the graph view 210, a user may select graphical user interface element 212 "serviceX" and in response to the user's selection, time layer 220 is displayed. As discussed above, time layer 220 may, in various implementations, be overlaid as a new layer in the graph view 200, e.g., over the element 212 "serviceX".

Time layer 220 may illustrate which subservices (e.g., database servers) were helping serviceX (e.g., an e-mail server) over a time span. As shown in time layer 220, at time 12:00 PM: subservice 222 was the provider and it was "green" as was the parent object, "serviceX" 212, as indicated by line 232. The color green may indicate an active status. Other indicators, colors, styles, lines, etc. may be used to indicate an active status. Indicators such as arrows 233 may indicate a direction of movement from one object to another object to illustrate how a relationship between objects moves over time.

At time 12:15: subservice 222 failed (which may be indicated by a thin red line 234). Then, subservice 224 was already in a "red" state (which may be indicated by thin red line 236). Thus, subservice 226 took over the provider role and it was in a "yellow" (i.e., warning) state as indicated by shaded line 238, but it was the most capable child object at this point in time. The shading 235 of the interval from 12:15-12:30 indicates that the entire serviceX was in a warning status during that time interval.

At time 12:30: the provider role shifted to subservice 224 because it became "green" as indicated by line 240 (e.g., go or active state) and because subservice 226 was still in a "yellow" (i.e., warning) state as indicated by line 242.

At time 12:45: the provider shifted back to subservice 222 because subservice 224 went "red" as indicated by line 244 (i.e. inactive state), and because subservice 226 also went "red" as indicated by line 248 and because subservice 222 was "green" as indicated by line 246. Thin red lines, such as line 248, may indicate a relationship when a child object is not a causal impact for a parent object. Thick green lines, such as line 246, may show the status of an active provider during a time interval (e.g., provider 222 during the time interval from 12:45-1:00) and a status of the provider impact (e.g., positive).

A time span (e.g., 12:00-1:00) may be selected or input by a user. In various implementations, selectable graphical user interface elements, such as arrow elements 270 and 272, may allow a user to shift a time span being examined (e.g., from 12:00-1:00 to 2:00-3:00). Users may move the time span using elements 270 or 272. Users may also start or stop or change the time span duration, or adjust the length of intervals displayed in a graph (e.g., increase from 15 minutes to 1 hour intervals).

In various implementations, users may apply a filter element 280, for example to filter which children are shown, as well as the type of relationships and children shown. Users may also use filter element 280 to filter a number of child layers shown to show depth of relationships.

In various implementations, users may also expand graph time layer 220 to view 250, to show both the providers and consumers of an object (e.g., the object associated with element 212). For example, view 250 illustrates that consumers 216 and 217 are consumers of "serviceX" represented by element 212.

It will be understood that the example illustrated in FIG. 2 is illustrative. More complex relationships between child objects and parent objects may exist. For example, in some cases, over time there may be fifty different child objects and at any one time there may be twenty shifting relationships to the parent.

Figure 3:
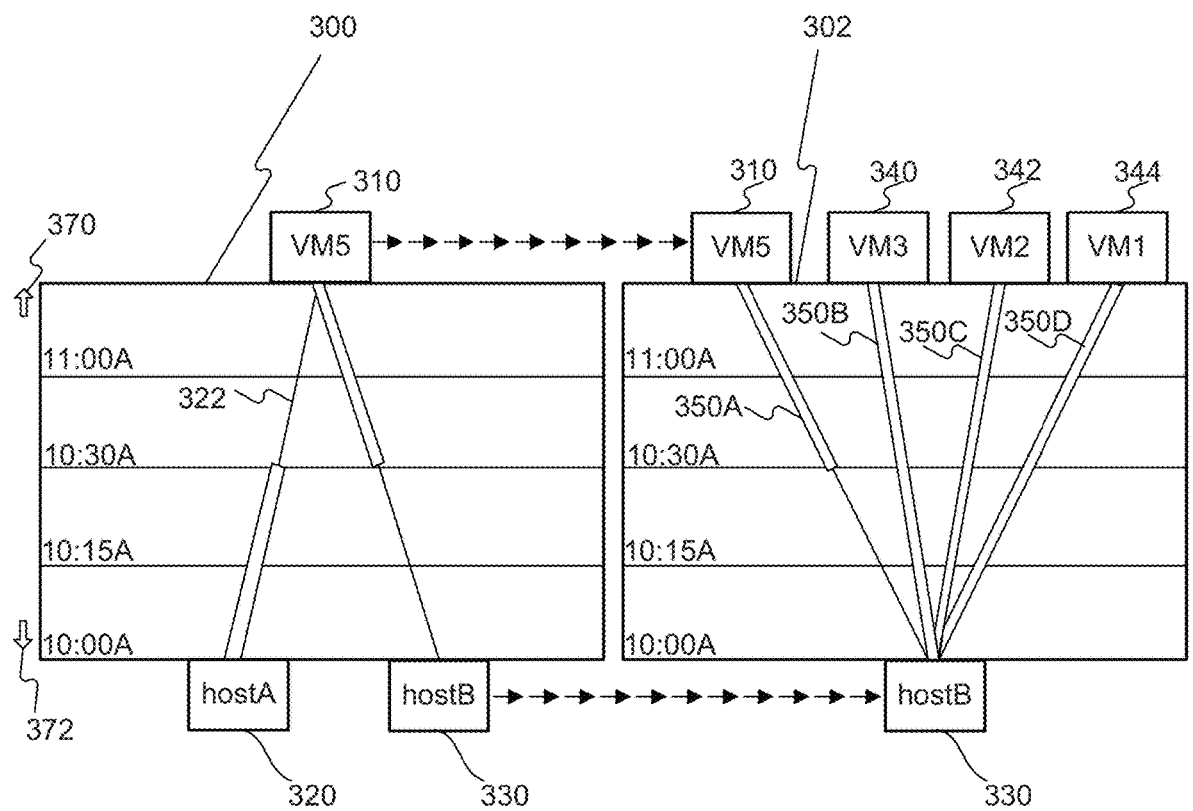
FIG. 3 is another example illustrating a graph time layer.

FIG. 3 is another example of a graph time layer. FIG. 3 includes graph 300 and graph time layer 302. Graph 300 is another example illustrating how a virtual machine ("VM")-oriented objects graph may appear. The graph 300 illustrates why a VM switched hosts. As shown in graph 300, "VM5" 310 moved at time 10:30 because "hostA" 320 went to a critical status, which may be indicated by a thin red line 322.

A user may view a graph time layer 302 of "hostB" 330, to show all the parent objects (which in this example are virtual machines) that "hostB" 330 services, over the time period from 10:00 AM to 11:15 AM. A user may view the graph time layer 302 by selecting an icon associated with "hostB" 330, or by selecting an option menu, with a key click, or by other activation options. As shown in graph time layer 302, "hostB" 330 services "VM5" 310 from 10:30 AM to at 11:15 AM. The "hostB" 330 also services "VM3" 340, "VM2" 342, and "VM1" 344 from 10:00 AM to 11:15 AM. The status of the service that "hostB" 330 provides to each virtual machine may be illustrated by the color, shading, or thickness of the line(s) 350A, 250B, 350C, 350D, between "hostB" 330 and the virtual machines. It will be understood that the specific depiction of lines 350A, 350B, 350C, and 350D are for illustration, and that various other colors, shapes, indicators, elements, etc. may be used to illustrate status and relationship(s). Thus, a user may view the status of child object "hostB" 330 and its relationship to various parent objects over a period of time.

As discussed above with respect to FIG. 2, the graph or graph time layer(s) may include various elements such as color lines to indicate the status of services, and selectable graphical user interface elements such as arrow elements 370 and 372, which may allow a user to shift a time span being examined. Users may move the time span start or stop or change its duration size, or adjust intervals.

Other configurations and implementations are possible. For example, as discussed above with respect to FIG. 2, a size of the time frame shown may be adjustable, such that a user may adjust a time frame from 30 minutes to two hours, for example. A time frame may also be set by default or by a user. Further, the various intervals may also be adjusted by a user, for example from fifteen minute intervals to one hour intervals. Users may scroll through a time-elapsed view of the graphs depicted in FIGS. 2 and 3 similar to a video player, using animation. Users may filter which children are shown, as well as the type of relationships and children shown. Users may also filter a number of child layers shown to show depth of relationships. For example, a user may wish to see two levels below a VM rather than only one layer and may expand a view to see two layers of child objects. User may also hide or show different paths, for example to only view causal relationships that affect a particular parent object, and avoid viewing other child objects. Users may multi-select top objects and look for common "bad" i.e., problem-causing children over time, to see patterns and remedy issues with the children. Users may select a "bad" child and expand a view upward to see if there is another top level object affected by the bad child.

Figure 4:
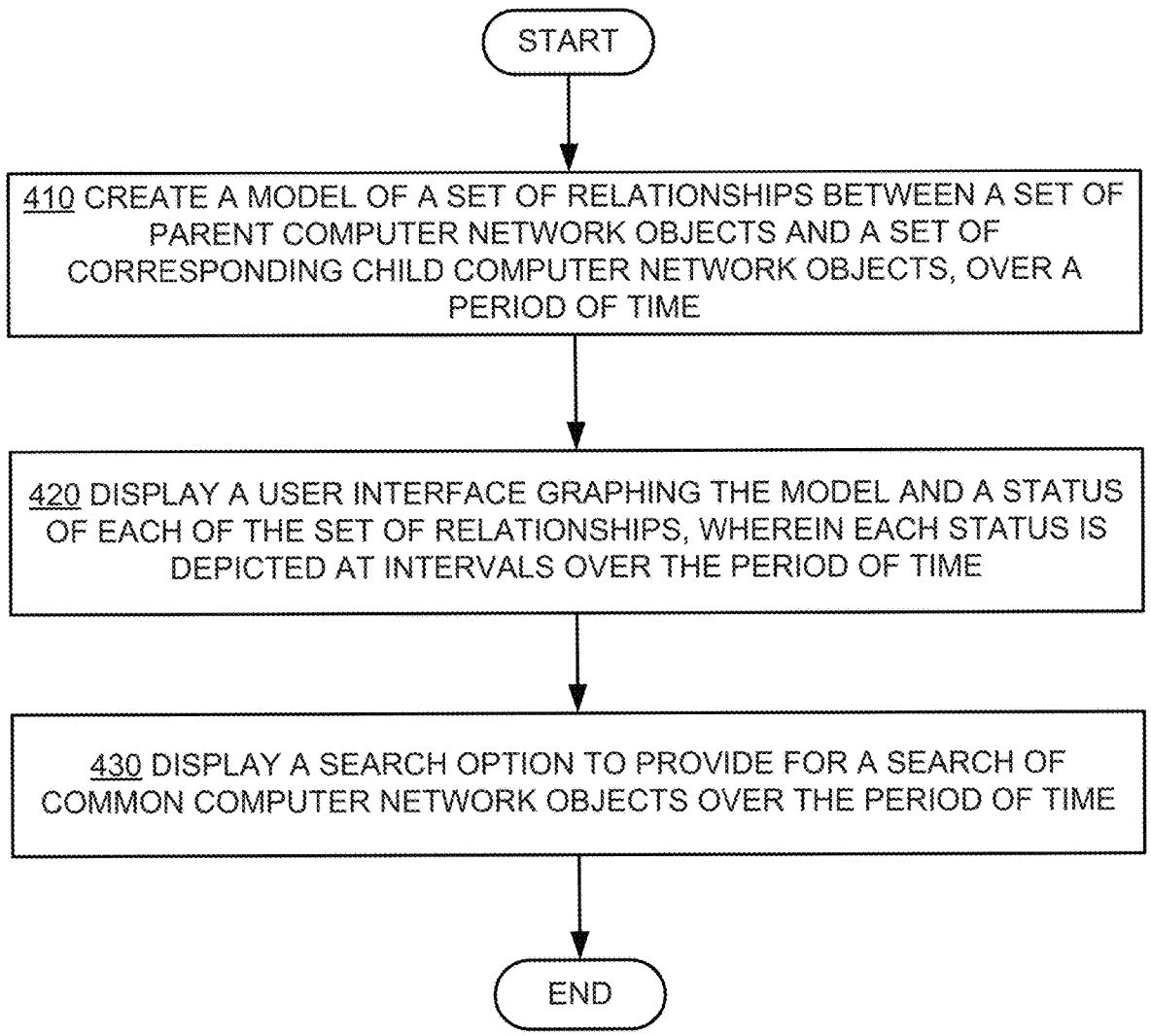
FIG. 4 is a flow chart illustrating an example method for providing a graph time layer.

FIG. 4 a flow chart illustrating an example method for providing a graph time layer. For convenience, the steps of the flow chart are described with reference to a system that performs the steps. The system can be, for example, a computing device described below with respect to FIG. 5, or other systems.

The system creates or accesses a model (e.g., a service model) of a set of relationships between a set of parent computer network objects and a set of corresponding child computer network objects, over a period of time (410). The system may, in some implementations, access a model that has been created and stored at a remote server or other computing device. The model may be created based on data acquired or aggregated by the computing device or by one or more servers associated with the set of parent computer network objects and the set of corresponding child computer network objects. The data includes statuses of each relationship between a child object and parent object such as those described above with respect to FIGS. 2 and 3, and the status changes over any time period. The collection and aggregation of such data may be automatically and continually updated by the computing device or by the server(s). In various implementations, the model and all associated data (e.g., statuses, history of relationship changes, etc.) may be stored by one or more servers and accessed by one or more computing devices.

The system displays a user interface graphing the model and a status of each of the set of relationships, where each status is depicted at intervals over the period of time (420). For example, the user interface may include the graph views depicted in FIGS. 2 and 3. The system may optionally display a search option to provide for a search of common computer network objects over the period of time (430). Such a search option may include a drop down menu, searchable tool bar(s), an HTML form with filters, or other options.

Figure 5:
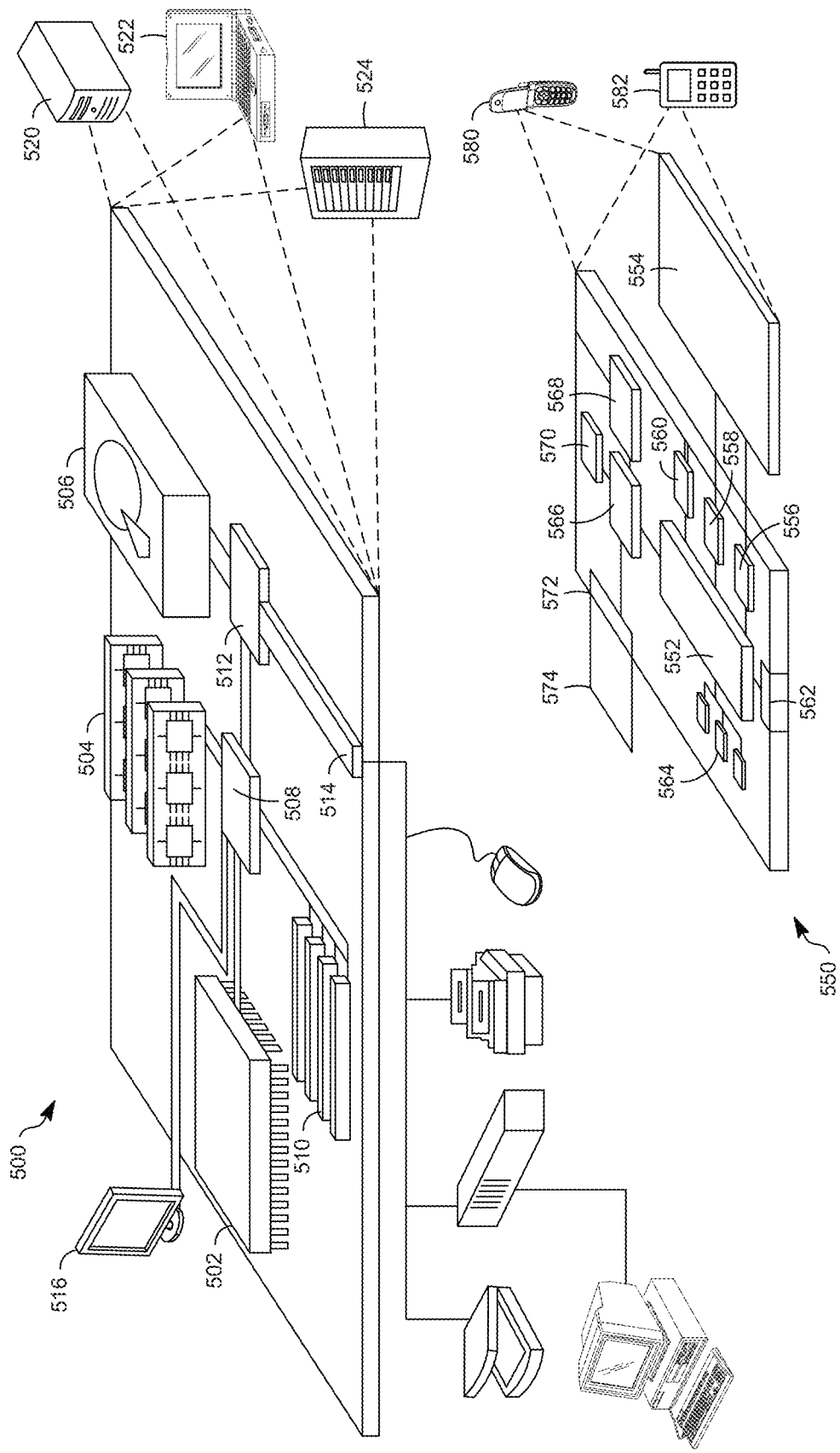
FIG. 5 shows example or representative computing devices and associated elements that may be used to implement systems and methods described here.

FIG. 5 is a block diagram showing example or representative computing devices and associated elements that may be used to implement systems and methods described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, BLUETOOTH, ETHERNET, wireless ETHERNET) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, which may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a BLUETOOTH, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    generating, by a microprocessor of a computing device, a model of a set of relationships representing operations of a plurality of computer network objects over a time period;
    graphing the model in a single view in a user interface;
    displaying historical data to illustrate changes in the set of relationships over the time period, the single view including multiple time intervals and a representation of changes in status corresponding to one or more of the plurality of computer network objects with a warning status or a critical status that occurred within each of the multiple time intervals displayed in the single view over the time period; and
    in response to selecting two or more of the plurality of computer network objects in the single view, generating, for each of the selected computer network objects, an expanded view representing the historical data over the time period, wherein each expanded view is configured to represent patterns of service usage over the time period.

2. The method of claim 1, wherein the method further includes:
    generating a time-based overlay for the single view, the time-based overlay including a status indicator representing a relationship for each of a plurality of services accessed by at least a portion of the plurality of computer network objects depicted in the model; and automatically depicting the time-based overlay in the single view upon receiving a user selected first and second time within the time period.

3. The method of claim 2, wherein the time-based overlay depicts a view of the relationship for each of the plurality of services accessed by the portion of the plurality of computer network objects between the user selected first and second time within the time period.

4. The method of claim 1, wherein the model is a service model representing at least:
interactions between a set of parent computer network objects in the plurality of computer network objects and a set of corresponding child computer network objects in the plurality of computer network objects, wherein the model is generated based on data aggregated by the computing device or by one or more servers associated with the set of parent computer network objects and the set of corresponding child computer network objects.

5. The method of claim 1, wherein:
a search control is provided in the user interface and configured to enable a user of the user interface to identify and display patterns of one or more of the plurality of computer network objects with a warning status or a critical status that occurred over the time period.

6. The method of claim 5, wherein identifying at least one pattern of one or more of the plurality of computer network objects with a warning status or a critical status that occurred over the time period enables for display, in the user interface, additional relationship views corresponding to the identified pattern.

7. A system comprising:
a display;
memory including executable instructions; and
at least one processor operably coupled to the memory and configured to execute the executable instructions to cause the system to:
generate, by a microprocessor of a computing device, a model of a set of relationships representing operations of a plurality of computer network objects over a time period;
graph the model in a single view in a user interface;
display historical data to illustrate changes in the set of relationships over the time period, the single view including multiple time intervals and a representation of changes in status corresponding to one or more of the plurality of computer network objects with a warning status or a critical status that occurred within each of the multiple time intervals displayed in the single view over the time period; and
generate, for at least a portion of the plurality of computer network objects, an expanded view representing the historical data over the time period in response to selecting a portion of the plurality of computer network objects in the single view, wherein each expanded view is configured to represent patterns of service usage over the time period.

8. The system of claim 7, wherein the processor is further configured to execute the instructions to cause the system to:
generate a time-based overlay for the single view, the time-based overlay including a status indicator representing a relationship for each of a plurality of services accessed by at least a portion of the plurality of computer network objects depicted in the model; and
automatically depict the time-based overlay in the single view upon receiving a user selected first and second time within the time period.

9. The system of claim 8, wherein the time-based overlay depicts a view of the relationship for each of the plurality of services accessed by the portion of the plurality of computer network objects between the user selected first and second time within the time period.

10. The system of claim 7, wherein the model is a service model representing at least:
interactions between a set of parent computer network objects in the plurality of computer network objects and a set of corresponding child computer network objects in the plurality of computer network objects, wherein the model is generated based on data aggregated by the computing device or by one or more servers associated with the set of parent computer network objects and the set of corresponding child computer network objects.

11. The system of claim 7, wherein:
a search control is provided in the user interface and configured to enable a user of the user interface to identify and display patterns of one or more of the plurality of computer network objects with a warning status or a critical status that occurred over the time period.

12. The system of claim 7, wherein identifying at least one pattern of one or more of the plurality of computer network objects with a warning status or a critical status that occurred over the time period enables for display, in the user interface, additional relationship views corresponding to the identified pattern.

13. A non-transitory computer-readable storage medium including code segments that when executed by a processor cause the processor to:
generate, by a microprocessor of a computing device, a model of a set of relationships representing operations of a plurality of computer network objects over a time period;
graph the model in a single view in a user interface;
display historical data to illustrate changes in the set of relationships over the time period, the single view including multiple time intervals and a representation of changes in status corresponding to one or more of the plurality of computer network objects with a warning status or a critical status that occurred within each of the multiple time intervals displayed in the single view over the time period; and
generate, for at least a portion of the plurality of computer network objects, an expanded view representing the historical data over the time period in response to selecting a portion of the plurality of computer network objects in the single view, wherein each expanded view is configured to represent patterns of service usage over the time period.

14. The computer-readable storage medium of claim 13, wherein the processor is further configured to:
generate a time-based overlay for the single view, the time-based overlay including a status indicator representing a relationship for each of a plurality of services accessed by at least a portion of the plurality of computer network objects depicted in the model; and
automatically depict the time-based overlay in the single view upon receiving a user selected first and second time within the time period.

15. The computer-readable storage medium of claim 13, wherein the model is a service model representing at least:
interactions between a set of parent computer network objects in the plurality of computer network objects and a set of corresponding child computer network objects in the plurality of computer network objects, wherein the model is generated based on data aggregated by the computing device or by one or more servers associated with the set of parent computer network objects and the set of corresponding child computer network objects.

16. The computer-readable storage medium of claim 13, wherein:
   a search control is provided in the user interface and configured to enable a user of the user interface to identify and display patterns of one or more of the plurality of computer network objects with a warning status or a critical status that occurred over the time period.

17. The computer-readable storage medium of claim 13, wherein identifying at least one pattern of one or more of the plurality of computer network objects with a warning status or a critical status that occurred over the time period enables for display, in the user interface, additional relationship views corresponding to the identified pattern.

* * * * *